United States Patent [19]
Kießling et al.

[11] Patent Number: 5,466,492
[45] Date of Patent: Nov. 14, 1995

[54] PROCESS FOR FIXING WOUND ITEMS WITH RADICALLY POLYMERISABLE COMPOUNDS

[75] Inventors: Gerhard Kießling, Hattingen; Raimund Pillath, Wuppertal; Stefan Reuther, Wuppertal; Anja Richter, Wuppertal, all of Germany

[73] Assignee: Herberts GmbH, Wuppertal, Germany

[21] Appl. No.: 303,709

[22] Filed: Sep. 9, 1994

[30] Foreign Application Priority Data

Sep. 11, 1993 [DE] Germany .................. 43 31 086.9

[51] Int. Cl.⁶ ........................................... C05F 2/46
[52] U.S. Cl. ................ 427/522; 427/116; 427/117; 427/214; 427/437.1
[58] Field of Search ...................... 427/116, 117, 427/204, 430.1, 522

[56] References Cited

U.S. PATENT DOCUMENTS

| | | | |
|---|---|---|---|
| 2,804,404 | 8/1957 | Thiessen | 427/116 |
| 3,283,742 | 1/1963 | Fuchs et al. | 427/116 |
| 3,313,863 | 4/1967 | Schnell | 260/864 |
| 4,720,392 | 1/1988 | Liresay | 427/54.1 |

FOREIGN PATENT DOCUMENTS

| | | | |
|---|---|---|---|
| 0134513 | 7/1983 | European Pat. Off. | H01B 3/42 |
| 295056 | 10/1991 | German Dem. Rep. | H02K 15/12 |
| 9201015 | 1/1992 | WIPO | C08J 5/24 |

*Primary Examiner*—Benjamin Utech
*Attorney, Agent, or Firm*—Schweitzer Cornman & Gross

[57] ABSTRACT

Process for fixing wound items made from electrically conductive materials by impregnation with radically polymerisable compositions and thermal curing characterised in that the wound items are impregnated by immersion impregnation, flow coating, vacuum impregnation, vacuum pressure impregnation or trickle impregnation and that simultaneously with or after thermal curing the wound articles are cured by high-energy radiation. The process operates with low energy requirements and low emissions of volatile substances. Radically curable compositions are also described.

13 Claims, No Drawings

PROCESS FOR FIXING WOUND ITEMS WITH RADICALLY POLYMERISABLE COMPOUNDS

BACKGROUND OF THE INVENTION

The present invention relates to a process for fixing wound items, in particular wire windings in electrical equipment, such as rotors, stators and transformers by impregnation (for example dipping or trickling) with radically polymerisable compositions. The invention also refers to radically polymerisable compositions usable for the process.

Electrical equiment, such as rotors, stators or transformers often consist of metal core around which a foil or wire material, for example a copper foil or wire is wound. The windings in these three-dimensional components are currently impregnated with radically polymerisable compounds and then cured in order to fix the wound items and to maintain their function. Curing is achieved by application of heat at temperatures of above 100° C. in an oven or by inductive heating.

The radically polymerisable compounds, known as impregnating resins or agents, contain for example unsaturated polyester resins which are dissolved in unsaturated aromatic or aliphatic radically polymerisable monomers, such as for example styrene or hexanediol diacrylate. Such monomers often have a very high vapour pressure, such that a large proportion thereof escapes during thermal curing. This gives rise to environmental problems; the materials containing styrene have, for example, an unpleasant odour and relatively high toxicity. Disposal, for example by subsequent burning, is thus necessary.

It is also known that the heat necessary for curing is produced by applying an electrical current to the electrically conductive windings after their impregnation and current conduction then produces the necessary temperatures. This leads to curing of the impregnating resins on end in the wire windings.

However, the wound items also contain solid parts, though which no current flows. The impregnating resin is not solidly cured on these parts. Therefore, it is additionally necessary to cure the components in an oven.

It is furthermore described in DE-A-40 22 235 to coat electrical wound items with radically polymerisable impregnating agents and, in order to prevent the vaporisation of substances hazardous to health, to crosslink the surface with UV radiation. This produces a cured surface and the low molecular weight polymerisable substances below the surface can no longer pass into the vapour phase on thermal crosslinking. However, in order to achieve crosslinking, this process requires subsequent energy intensive heat treatment in an oven. A similar process is described in DD 295 056.

SUMMARY OF THE INVENTION

The object of the present invention is to provide a process for coating wound items with impregnating agents which are suitable for fixing three-dimensional components having wire windings, which agents exhibit good penetrating power into the wound items, reduced emissions of volatile substances hazardous to health and reduced energy requirements for crosslinking. Further compositions usable for the process shall be provided.

DETAILED DESCRIPTION OF THE INVENTION

This object is achieved according to the invention by a fixing process in which the three-dimensional articles to be fixed in the form of wound items made from electrically conductive materials are impregnated with radically polymerisable compounds (compositions) and are thermally cured. The process is characterised in that the wound items are impregnated by immersion impregnation, flow coating, vacuum impregnation, vacuum pressure impregnation or trickle impregnation and that they are additionally cured by high-energy radiation simultaneously with or after thermal curing. In particular the exposed impregnated surfaces are cured by high-energy radiation simultaneously with or after thermal curing. In accordance with a preferred embodiment of the invention, thermal curing is achieved by passing an electrical current through the windings of wound items. According to a further preferred embodiment of the invention, the wound articles are pre-heated, e.g. to temperatures up to 180° C., and then impregnated by immersion, flow coating, vacuum impregnation, vacuum pressure impregnation or trickle impregnation. In particular the process of the invention can be achieved by using radically polymerisable compounds which contain free radical initiators as individual compounds or as mixtures, which respond both to high-energy radiation and to heat.

By means of the process according to the invention, emissions of substances hazardous to health are reduced and better utilisation of the impregnating agents is achieved. Furthermore, the energy required for crosslinking may be substantially reduced. The impregnating compounds are applied to the wound items using known processes. Care must be taken during application that the impregnating agents may flow and penetrate effectively. Before or, preferably, after application it is possible to produce an elevated temperature by passing a current through the electrical conductors. In this manner, crosslinking is initiated immediately on impregnation. The impregnating agents are fixed within the windings (coil) and can no longer flow out. The formation of defects, for example cavities, by flow out is prevented by the rapid fixing. Crosslinking is performed and the volatile reactive constituents have less time to pass into the vapour phase.

Temperature can be controlled by the current passed. The temperature is selected such that adequate crosslinking of the impregnating agents is achieved. The heat is produced in the wound items to be coated with the impregnating agent, i.e. there is no unnecessary heating of electrically non-conductive components. The temperature may be measured and immediately controlled by means of the current which is passed without additional measuring equipment. It is possible by means of an elevated temperature during application of the impregnation compounds to improve penetration of the impregnating agents into the substrate. It may optionally also be possible to use materials of a moderately high viscosity, which may then penetrate effectively at the elevated temperature.

However, in customary impregnation processes, some plastic and solid components are also coated. Due to the generation of heat in the electrically conductive parts, these coated areas crosslink only slightly. In order to ensure correct crosslinking, the components are treated with high-energy radiation, for example UV radiation or electron beams, after thermal crosslinking around the windings. It is in particular the surface of the components which is cured here, in particular the only slightly coated surfaces of solid parts, which are not heated by passage of the electrical current. After treatment with the high-energy radiation, the substrates are uniformly crosslinked.

Radically polymerisable compounds are used according to the invention which are curable both by high-energy radiation (for example UV radiation or electron beam irradiation) and by heat. It may be favourable to this end to activate the radically polymerisable compounds by adding free-radical initiators. Free radical initiators which may be considered are those which may be activated by high-energy radiation and heat. In particular, the use of mixtures of free-radical initiators responsive to high-energy radiation (photoinitiators) and those which are responsive to heat is favourable.

Addition of photoinitiators is largely dependent upon the type of radiation with which the surface is to be cured. Thus, for example, it is not necessary to add photoinitiators if the surface is to be cured by electron beam irradiation.

The initiators to be used according to the invention, both the photoinitiators and the thermally responsive initiators, are those customary in this sector.

Photoinitiators which may, for example, be used are those customary initiators which absorb in the wavelength range from 190 to 400 nm. Examples of such photoinitiators are initiators containing chlorine, such as aromatic compounds containing chlorine, described for example in U.S. Pat. No. 4,089,815; aromatic ketones, as described in U.S. Pat. No. 4,318,791 or EP-A-0 003 002 and EP-A-0 161 463; hydroxyalkylphenones, as described in U.S. Pat. No. 4,347,111; phosphine oxides, as described in EP-A-0 007 086, 0 007 508 and 0 304 783; water soluble initiators, for example based on hydroxyalkylphenones, as described in U.S. Pat. No. 4,602,097, unsaturated initiators, such as OH-functional aromatic compounds esterified, for example, with acrylic acid, as described in U.S. Pat. No. 3,929,490, EP-A-0 143 201 and EP-A-0 143 201 and EP-A-0 341 560; or combinations of such initiators, as for example described in U.S. Pat. No. 4,017,652. Preferred examples are 2-methoxy-2-hydroxypropiophenone, benzophenone, thioxantone derivatives, acylphosphine oxides and Michler's ketone.

Particularly preferred photoinitiators usable for the invention are acylphosphine oxides. They are known to the skilled person. Examples are described in EP-A-0 007 086, EP-A-007 508 and EP-A-0 304 783. Specific preferred examples have the formula

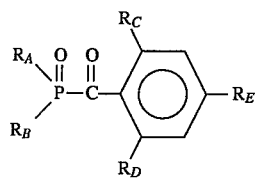

wherein $R_A$=linear or branched alkyl having 1 to 6 carbons atoms, $R_B$=$R_A$, wherein $R_A$ and $R_B$ can be the same or different from each other, or aryloxy or arylalkoxy, or wherein $R_A$ and $R_B$ can be combined to form a o-phenylene dioxy group, $R_C$, $R_D$, $R_E$=alkyl, alkoxy or alkylthio each having 1 to 6 carbon atoms, wherein $R_C$, $R_D$ and $R_E$ can be the same or different from each other.

The above-stated photoinitiators may be used alone or as a mixture; by way of example, combinations of phosphine oxides with further customary photoinitiators are preferred.

The thermally responsive free-radical initiators which may be used according to the invention are also customary initiators which may be used for the thermal curing of radically polymerisable compounds.

Examples of such thermally responsive initiators are C—C labile compounds, as are for example described in German patent DE-PS 12 19 224; these are 1,2-substituted ethanes of the general formula

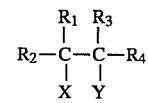

in which $R_1$ and $R_3$ mean aromatic residues, $R_2$ means a hydrogen atom or an aliphatic or aromatic residue, $R_4$ means an aliphatic or aromatic residue and X and Y mean an optionally blocked hydroxyl group and/or halogen.

Further examples of 1,2-substituted ethanes, which are suitable as initiators for free-radical polymerisation with application of heat, are those of the general formula

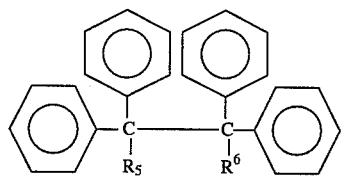

in which $R_5$ and $R_6$ mutually independently mean —OH, —OCH$_3$, —OC$_6$H$_5$, —CH$_3$, —CN, —NH$_2$, Cl or —OSi(CH$_3$)$_3$, as are, for example, described by A. Bletzki and W. Krolikowski in *Kunststoffe* 70 (1980) 9, pages 558 to 562.

Further examples of thermally activatable free-radical initiators based on 1,2-substituted ethanes are those of the general formula

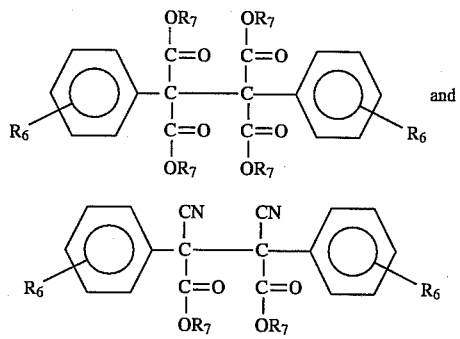

in which the residues $R_6$ may mutually independently denote hydrogen or one or more alkyl or alkoxy groups, such as methyl or methoxy groups; and in which the groups $R_7$ mutually independently denote hydrogen atoms or alkyl groups, for example with 1 to 4 carbon atoms, such as methyl or ethyl groups. Such compounds are, for example, described by H. Wolfers in *Kunststoffe* 68 (1978) 9, pages 553 to 555 and by D. Braun in *Kunststoffe* 69 (1979) 2, pages 100 to 104; these are customary commercially available initiators. A further group of thermally activatable free-radical initiators are bifunctional initiators of the cyclic silyl pinacol ether type, as for example described in *Polym. Bull.* 16, 95 (1986). As already stated for the photoinitiators, the thermally activatable initiators may also be used as mixtures.

Customary peroxides and azo compounds may also be used as initiators. Such compounds are known as photoinitiators and/or as thermally labile initiators. Peroxides and azo-based initiators may thus be used alone, provided that their properties as photoinitiators and thermally activatable initiators are adequate. They may optionally be used as a mixture with photoinitiators or thermally labile initiators.

Examples of usable peroxides are organic peroxides as are, for example, customary in the plastics industry as free-radical initiators; such as di-t.-butyl peroxide, dibenzoyl peroxide, peroxycarboxylic acids, such as peroxyacetic acid, peroxy dicarbonates, such as di-sec.-butylperoxy dicarbonate, peroxy diesters, such as 2-ethylhexanoic acid tert.-butyl ester, hydroperoxides, such as cumene peroxide and ketone peroxide, such as methyl ethyl ketone peroxide. An example of an azo initiator is azobisisobutyronitrile, which may primarily be used as a thermally activatable initiator.

It is favourable according to the invention to use mixtures of photoinitiators and thermally activatable initiators. The initiators are used in the quantities customary respectively for photoinitiators and thermally responsive initiators. The total quantity of initiators used may, for example, be from 0.01 to 20, preferably from 0.1 to 10, particularly preferably from 0.1 to 5, e.g. 0.5 to 5 or 0.5 to 3 wt. % related to total weight.

The maximum quantity which may be added is virtually unlimited; the quantity is kept as low as possible for economic reasons. The quantity ratios of photoinitiator to thermally labile initiator may vary over a wide range; they may, for example, range from 1:1 to 20:1, preferably from 1:1 to 10:1 and vice versa.

Photoinitiators must be added in a quantity such that after thermal crosslinking it is still possible to achieve adequate crosslinking of the areas not exposed to heat by means of the high-energy radiation.

In accordance with a preferred embodiment, the invention relates to such radically polymerisable compositions which are particularly useful for the process of the invention. They are characterized in that they contain a combination of additives comprising:

A) one or more acylphosphine oxides as photoinitiators; which are preferably the above mentioned acylphosphine oxides, B) one or more C—C— labile initiators which are thermally activatable; such as the above exemplified compounds, and C) one or more stabilizers of the type of hydroquinone, quinone, alkylphenoles and/or alkylphenole ethers.

Surprisingly it has been found that such radically polmerisable compositions are particularly useful for the impregnation of pre-heated wound items, the pre-heating temperatures being up to 180° C. This is very surprising, since it has been found that dipping of heated wound items into presently used impregnation compositions has a negative influence on the compositions and can even furnish an undesired polymerisation. Thus, the process of the invention can particularly be carried out with such compositions by dipping, without deterioration of the compositions. Further it has been shown that such compositions have a very good storage stability especially up to temperatures of 50° C.

It has been found that the following stabilizers chosen from the many known stabilizers furnish the desired effects within the above mentioned combinations: stabilizers of the type of hydroquinones, quinones, alkylphenoles and/or alkylphenole ethers. Specific examples are hydroquinone, methyl hydroquinone, p-benzoquinone, secondary and tertiary methyl phenoles, tertiary butyl phenoles, tertiary amyl phenoles, octyl phenoles, butylated xylenoles and butylated cresoles.

In accordance with the invention it is convenient to use the stabilizers in the form of mixtures thereof. It is desirable to combine at least two of the above mentioned stabilizers in order to achieve the desired thermostability of the impregnating resins up to temperatures of 50° C. during longer time periods; further, curing reactions of the impregnating compositions at curing temperatures above 100° C. are not deteriorated. It is possible to use conventional amounts of the stabilizers. The total amount of the used stabilizers can, e.g. be 0.005 to 0.5, preferably 0.01 to 0.1, particularly preferred 0.01 to 0.05 wt. %, referred to the total amount of the composition. The ratio of the amounts of the stabilizers is broadly variable; if, e.g. two stabilizers are used, the ratio may vary from 1:1 to 20:1, preferably from 1:1 to 10:1 and vice versa. Similar ranges can be used if more than two stabilizers are used. Particularly preferred mixtures of stabilizers are such of the quinone type with such of the alkylphenole type.

Radically polymerisable compounds which may be used as impregnating resin compounds are those known to the person skilled in the art as radically polymerisable materials. These materials may be monomers, oligomers or polymers or copolymers.

Examples of radically polymerisable compounds are customary radiation-curable, in particular UV curable, compounds based on monomers, oligomers, polymers, copolymers or combinations thereof, having one or more olefinic double bonds, such as for example esters of acrylic acid and methacrylic acid, together with compounds having one or more vinyl or allyl double bonds. Examples of monofunctional monomers are butyl (meth)acrylate and examples of tri- and tetrafunctional monomers are trimethylolpropane tri(meth)acrylate and pentaerythritol tri- or tetra(meth)acrylate. The term (meth)acrylate used here means acrylates and/or methacrylates. Examples of vinyl or allyl unsaturated monomers are styrene and styrene derivatives, such as divinylbenzene, p-methylstyrene and vinyltoluene. Examples of allyl compounds are diallyl phthalate and pentaerythritol tri- or tetraallyl ester. Example of oligomers or prepolymers are (meth)acrylic functional (meth)acrylic polymers, epoxy resin (meth)acrylates, for example reaction products prepared from 2 mol of (meth)acrylic acid and customary commercially available epoxy resins, such as for example Epicote® 828, polyester (meth)acrylates, polyether (meth)acrylates, urethane (meth)acrylates, amine (meth)acrylates, unsaturated polyesters, unsaturated polyurethanes, silicone (meth)acrylates or combinations thereof. Examples of such curable products are described in the following references: epoxy (meth)acrylates in EP-A-0 033 896, EP-A-0 049 992 and U.S. Pat. No. 4,485,123; urethane (meth)acrylates in EP-A-0 053 749, EP-A-0 209 684 and U.S. Pat. No. 4,162,274; polyester (meth)acrylates in EP-A-0 083 666, DE-A-38 10 140, DE-A-38 20 294.

Radically polymerisable compounds which are particularly suitable for the present invention are those containing olefinically unsaturated polyesters and olefinically unsaturated monomers as a reactive diluent, as, e.g., described in EP-A-0 134 513. The monomers may be mono- or polyunsaturated. Examples of such monomers are those stated above. Acryloyl or methacryloyl compounds are favourable. Particularly preferred examples of such reactive diluents are hexanediol diacrylate and butanediol diacrylate, which may be used with the unsaturated polyesters either alone or mixed together. Further examples of monomers which may favourably be used with olefinically unsaturated polyesters are styrene and vinyltoluene. Examples of impregnating resin compounds based on olefinically unsaturated polyesters with monomers as reactive diluents are stated in EP-A-0 134 513.

Unsaturated polyesters which may be used are those polyester resins known for this purpose, in particular so-called imide-containing unsaturated polyesters, as are described in DE-A-15 70 273, DE-A-17 70 386 and DE-A-28 56 050. It is, however, also possible to use so-called imide-free polyesters, as have been known for decades. These unsaturated polyesters are condensation products prepared from polybasic carboxylic acids, polyhydric alcohols and, if they contain imide, compounds containing amino groups, optionally with a proportion of monofunctional compounds. Examples of polybasic carboxylic acids are dicarboxylic acids, such as maleic or fumaric acid, citraconic acid, itaconic acid, optionally mixed with saturated or aromatic carboxylic acids, such as succinic or adipic acid, phthalic acid, isophthalic acid, terephthalic acid and the like, together with tetrahydrophthalic acid, endomethylenetetrahydrophthalic acid or the corresponding partially or completely halogenated compounds (the latter have flame retardant properties). Examples of compounds with differing functional groups are citric acid, monoethanolamine, aminoethane carboxylic acid, together with the corresponding amino alcohols or amino carboxylic acids containing three or four $CH_2$ groups. These acids may be used in the form of esters, semi-esters or anhydrides.

The compounds containing hydroxy groups which may be used are basically those compounds used in the prior art for the production of polyesters. Suitable compounds are, for example diols, such as for example glycol, neopentyl glycol, propylene glycol, and polyols with 3 or 4 hydroxy groups, such as for example glycerol, trimethylolpropane, trimethylolethane, pentaerythritol, dipentaerythritol, trisethyl isocyanurate.

The unsaturated polyesters containing imide conveniently contain condensed tetrahydrophthalic acid or the anhydride thereof, which, together with amino groups, form a 5-membered imide ring. The polyesters may also contain monofunctional carboxylic acids, alcohols and/or amines as chain terminators. They may also contain saturated and unsaturated oils, for example hydroxy-functional oils, such as castor oil, or carboxy-functional oils, such as maleate oils.

In order to produce the radically polymerisable compounds used according to the invention, the above-stated compounds are mixed with the free-radical initiators, in particular the mixture of photoinitiators and thermally activatable initiators and stabilisers which can be present. The radically polymerisable compounds may additionally contain customary additives, such as pigments, extenders, plasticising components, accelerators (for example metal salts, substituted amines), stabilisers (for example hydroquinone, benzoquinone) as are familiar to the person skilled in the art. The compounds contain no solvents, The components can be mixed in any order. Preferably any used stabilisers are mixed first into the polymerisable composition; afterwards the initiators are added.

The use of radically polymerisable compounds for impregnating wound items to be stabilised, for example wire windings, may, for example, proceed in the following manner.

By immersion impregnation:

In this process the item to be impregnated is immersed in the impregnating resin for a period of time determined, for example, by preliminary testing or, in the continuous process, is drawn through the impregnating resin.

By flow coating:

Here the item to be impregnated is placed in an impregnating container, which is then filled with impregnating agent so flooding the substrate.

By vacuum impregnation and vacuum pressure impregnation:

When this process is used, the item to be impregnated is first evacuated in a vacuum vessel; once the desired vacuum is achieved, the impregnating agent is transferred from a storage container into the vacuum vessel and then optionally applied to the substrate with pressure.

By trickle impregnation:

This process is preferred when impregnating rotors; here the objects are not immersed in the impregnating agent, but the polymerisable compound is applied to the substrate using nozzles. The substrate may, for example, rotate during application.

In order to ensure good penetration, it may be favourable to preheat the object to be impregnated in this manner; heating may be provided by electrical current or by a separate heat source, for example an oven. Heating may proceed during, preferably before impregnation. The temperature should, however, be selected such that good flow is possible. If very low viscosity materials are used gelation may even occur. In this manner, dripping and flow off from the wound items is avoided. This reduces material losses and fewer defects, for example voids, are formed in the substrate.

In accordance with the invention it is also possible to heat the impregnating resin in order to achieve a good penetration into the wound items. This is particularly convenient, if the preferred impregnating compositions of the invention are used, which contain a combination of acylphosphine oxides as photoinitiators, C—C— labile initiators which can be activated thermally and one or more stabilizers of the type of hydroquinones, quinones, alkylphenoles and/or alkylphenole ethers.

After impregnation, the object is heated in order to cure the impregnating resin. The heat for crosslinking can be produced by passing a current though the windings, however, it is also possible to use an oven or an IR source.

The remainder of the curing reaction proceeds by thermal treatment which may be performed on-line or continuously, wherein the temperatures are, for example, in the range from approximately 80° to 180° C. with reaction times, which vary depending upon the system to be cured, of for example 1 minute to 180 minutes. Temperature can, e.g., be simply controlled by the quantity of current being passed. No solid parts are heated, so energy consumption remains low.

Following the impregnation operation, optionally in parallel with thermal crosslinking, the radically polymerisable compound at the surface of the substrate to be fixed and over the unheated solid parts is cured by a radiation source which emits high-energy radiation, for example a UV light source or electron beam source. Customary sources suitable for UV or electron beam irradiation may be used as radiation sources. Suitable UV radiation sources are, for example, high or medium pressure mercury lamps.

The three-dimensional articles are conveyed past the radiation source for surface radiation curing, such that the process may be performed on-line. The article may, for example, be conveyed past the radiation source while rotating in order to ensure an even radiation dose.

The high-energy radiation may, for example, act upon the object for a period of between 5 seconds and 15 minutes, in particular between 2 and 10 minutes. Using a high energy density it can even be lower. In this manner, the portions of the impregnating agents which have not yet been thermally cured are crosslinked. The surface of the wound items, which under certain circumstances may not yet have received sufficient thermal crosslinking, is post-cured by the radiation. Wound items are obtained which have a uniformly crosslinked surface.

Wound items with electrically conductive parts may be fixed using the process according to the invention. The process according to the invention is, however, in principle applicable to other substrates requiring thermal curing and fixing. The process according to the invention is particularly suitable for fixing wire windings, in particular for fixing electrical windings, as are used in electrical equipment, for example in rotors, stators, transformers etc. The process according to the invention may, however, also be used for fixing wound items in the electrical sector having metal foils, for example copper foils.

Emissions of volatile monomers are largely prevented by the process according to the invention due to the rapid formation of a polymer layer. Fixing may also be quickly achieved by the beginning gel-formation in the impregnated areas, such that flow from or out of the substrate is prevented. In this manner, material consumption is greatly reduced at constant impregnation quality or improved impregnation quality is achieved at constant material consumption. The process leads to improved economic viability and/or to a longer service life of the windings under thermomechanical stress. A particular advantage of the process according to the invention is that it may be performed on-line or continuously. Economies in plant and equipment, for example costly ovens, may also be achieved by the process according to the invention.

PRACTICAL EXAMPLE 1

A coating composition is prepared from a styrene solution of a mixture prepared from an isophthalic acid polyester with an imide polyester (produced according to EP-A-134 513) with a thermoinitiator and a photoinitiator (as described in DE 43 18 048):

50 parts of unsaturated imide polyester (solid)
50 parts of isophthalic acid polyester (solid)
77.5 parts of styrene (solvent)
0.05 parts of hydroquinone (stabiliser)
5 parts of phenylethane derivative (DE-A-12 19 224) (thermoinitiator)
5 parts of 1-phenyl-2-hydroxypropiophenone (photoinitiator).

COMPARATIVE TEST

A stator is slowly (35 mm/min) immersed in the coating composition according to practical example 1, after a dwell time of 1 minute slowly removed and then left to drain for 20 minutes.

The stator is then cured in an oven for 1 hour at 150° C.

EXAMPLE 1

A stator is impregnated in the same manner as in comparative test 1. The stator is then heated electrically to 150° C. in 2 minutes and held at this temperature for 8 minutes. Thereafter it is irradiated for 10 minutes with UV light of a wavelength of approximately 350 nm.

EXAMPLE 2

A stator is heated electrically for 2 minutes, such that a temperature of 60° C. is reached. The stator is slowly immersed in the coating composition according to practical example 1, held there for 10 seconds and lifted out of the coating composition. The stator is then left to drain for 5 minutes. Curing is achieved by heating for 2 minutes and maintaining a temperature of 150° C. for 8 minutes. Thereafter, the stator is cured for 10 minutes with UV light.

EXAMPLE 3

A stator is heated to 60° C. in an oven and then impregnated, electrically heated and irradiated as in example 2.

The stators are cured and have good crosslinking even in those parts through which no electrical current has passed.

The quantity of wet resin lost during curing and the quantity of styrene evaporated off are determined. The take-up of dry resin is largely constant at between 43 and 46 g per stator.

|  | Draining loss at curing | Styrene loss |
| --- | --- | --- |
| Comparative test | 35 g | 20 g |
| Example 1 | 24 g | 11 g |
| Example 2 | 9 g | 4 g |
| Example 3 | 16 g | 9 g |

The stators have good electrical properties and mechanical stability. According to the invention, styrene losses to the environment are substantially less and resin losses from the wet coating composition are reduced.

Two conventional impregnating resins on the basis of an unsaturated polyesterimide (UPEI) and an unsaturated polyester (UPE), prepared. e.g., in accordance with EP-A-0 134 513, are added with different amounts of the components of the combination of additives of the present invention, e.g. with acylphospinoxide (APO), C—C— labile initiators, stabilizers of the type of hydroquinones (Stabi 1) and/or quinones (Stabi 2), and/or stabilizers of the type of alkylphenoles (Stabi 3) and/or alkylphenole ethers (Stabi 4).

The comparative tests do not contain APO.

In order to prepare further comparative tests, impregnating compositions on the bais of UPE were prepared, wherein the C—C— labile initiators were replaced by a peroxide or an azocompound as thermally labile initiators.

Impregnating resins of the composition given in Table 1 were prepared. The numbers in the table refer to 100 parts by weight of the impregnating resin.

TABLE 1

| | Composition of impregnating resins | | | | | | |
|---|---|---|---|---|---|---|---|
| | Resin | C-C-labile | APO | Stabi 1 | Stabi 2 | Stabi 3 | Stabi 4 |
| Comparative Ex. | | | | | | | |
| 1 | UPEI | 1 | | 0,01 | — | — | — |
| 2 | UPEI | 2 | | 0,01 | — | — | 0,01 |
| 3 | UPEI | 2 | | 0,01 | — | 0,02 | 0,01 |
| 4 | UPE | 1' | | 0,005 | — | — | 0,005 |
| 5 | UPE | 2' | | 0,007 | — | — | 0,007 |
| | | Peroxide | | | | | |
| 6 | UPE | 1 | — | 0,02 | — | — | — |
| | | Azacomp. | | | | | |
| 7 | UPE | 0,50' | — | 0,02 | — | — | — |
| Example | | | | | | | |
| 4-1 | UPEI | 1 | 1 | 0,008 | 0,002 | — | — |
| 4-2 | UPEI | 2 | 1 | 0,01 | 0,002 | — | 0,01 |
| 4-3 | UPEI | 2" | 1 | 0,01 | — | 0,04 | 0,01 |
| 4-4 | UPE | 1' | 1 | 0,005 | 0,003 | — | 0,005 |
| 4-5 | UPE | 2' | 1 | 0,007 | — | 0,04 | 0,007 |

The temperature stability was tested in order to demonstrate the improved stability of the impregnating resins of the invention.

A bar of iron having a weight of 525 g and aspects of 120×60×10 mm is heated in an oven to 150° C. and the heated bar is dipped into 1000 g of impregnating resin. The bar is maintained during 30 seconds in the impregnating resin whereafter it is held 30 seconds over the impregnating resin in order to recover the drops. This is repeated several times in intervals of one half hour (30 minutes=1 cycle). After dipping the resin is stirred and the container containing the impregnating resin is left open up to the end of each cycle.

After a total of 15 cycles the stability of the impregnating resin is tested by measuring:

viscosity (test of the discharging time), reactivity (time for gelation), stability at 40° C. and stability at 50° C.

The results are summarized in the following Table 2:

If component APO of the combination of additives of the present invention is not contained (Comparative Examples 1 to 5) the value for the stability at 40° C. and 50° C. is decreased after 15 cycles. If, however, component APO is contained in the composition together with nearly the same content of stabilizers (Examples 4-1 to 4-5), the stability at 40° C. and 50° C. is enhanced and is almost not different during 15 cycles.

If the impregnating composition contain a peroxide or an azocompound as initiators instead of the components of the additive combination of the invention, the compositions demonstrate a drastically reduced storage stability (Comparative Examples and Examples 4-6 and 4-7).

We claim:

1. A process for impregnating wire windings of electrical equipment with a free radical polymerizable and heat curable composition, which process comprises (a) impregnating said windings with said composition by the technique of immersion, flow coating, vacuum impregnation, vacuum pressure impregnation, or impregnation through trickle nozzles;

TABLE 2

| | Characteristics of imprego. resins before and after temperature test | | | | | | | |
|---|---|---|---|---|---|---|---|---|
| | discharging time (sec) | | gel time at 100° C. (min) | | stability at 40° C. (d) | | stability at 50° C. (d) | |
| | 0 cycles | 15 cycles | 0 cycles | 15 cycles | 0 cycles | 15 cycles | 0 cycles | 15 cycles |
| Comparative Example | | | | | | | | |
| 1 | 66 | 75 | 10,8 | 10,1 | 21 | 13 | 7 | 4 |
| 2 | 67 | 77 | 6,8 | 6,6 | 16 | 10 | 4 | 1 |
| 3 | 88 | 106 | 8,0 | 7,5 | 19 | 11 | 6 | 3 |
| 4 | 63 | 72 | 9,8 | 9,5 | 31 | 22 | 9 | 5 |
| 5 | 69 | 79 | 7,1 | 6,8 | 28 | 18 | 8 | 4 |
| 6 | 65 | 76 | 50,0 | 46,0 | 4 | 2 | <1 | <1 |
| 7 | 66 | 75 | 5,0 | 4,8 | 4 | 2 | <1 | <1 |
| Example | | | | | | | | |
| 4-1 | 68 | 79 | 12,9 | 12,9 | 38 | 36 | 11 | 11 |
| 4-2 | 67 | 77 | 7,1 | 7,1 | 25 | 25 | 7 | 8 |
| 4-3 | 80 | 93 | 7,5 | 7,0 | 50 | 48 | 13 | 12 |
| 4-4 | 65 | 75 | 10,5 | 10,5 | 53 | 49 | 15 | 13 |
| 4-5 | 63 | 74 | 7,8 | 7,6 | 48 | 46 | 12 | 11 |

(b) thermal curing said applied composition; and (c) during or after said thermal curing further curing the applied composition by exposure to high energy radiation.

2. Process according to claim 1, characterized in that the thermal curing is carried out by applying electrical current to the windings.

3. Process according to claim 1, characterized in that the windings are pre-heated before the impregnation.

4. Process according to claim 3, characterized in that the pre-heating of the windings is carried out by applying electrical current thereto.

5. Process according to claim 1, characterized in that the windings are pre-heated to temperatures up to 180° C.

6. Process according to claim 1, characterized in that the impregnation is performed with a radically polymerisable compound containing free-radical initiators which respond both to high-energy radiation and the application of heat.

7. Process according to claim 1, characterized in that the impregnation is performed with a radically polymerisable compound containing a mixture of free-radical initiators responsive to high-energy radiation and thermally responsive free-radical initiators.

8. Process according to claim 1, characterized in that the surface of the applied composition is cured with UV radiation or electron beam radiation.

9. Process according to claim 1, characterized in that the impregnation is performed with a radically polymerisable compound containing no free-radical initiators responsive to high-energy radiation and the exposed surface of the applied composition is cured with electron beam radiation.

10. Process according to claim 1, characterized in that the windings are windings of electrically conductive wires.

11. Process according to claim 1, characterized in that thermal crosslinking proceeds after the impregnation.

12. A process according to claim 1, wherein the heat curable composition contains as additives (a) one or more acylphosphine photoinitiators, (b) one or more C—C— labile thermally activated initiators, and (c) one or more hydroquinone, quinone, alkylphenol, and alkylphenol ether stabilizers.

13. A process according to claim 1, wherein prior to curing by high energy radiation the windings are heated to a temperature between 80° C. and 180° C.

* * * * *